United States Patent [19]

Kuo

[11] Patent Number: 5,618,145
[45] Date of Patent: Apr. 8, 1997

[54] FASTENER MODULE

[76] Inventor: Jung-feng Kuo, No. 2, Lane 343, Chengkung Rd., Fengyuan City, Taichung Hsien, Taiwan

[21] Appl. No.: 602,348

[22] Filed: Feb. 16, 1996

[51] Int. Cl.$^6$ .......................... F16B 33/00; F16B 37/08
[52] U.S. Cl. .................. 411/432; 411/368; 411/533; 411/544
[58] Field of Search ..................... 411/368, 369, 411/432, 353, 533, 352, 544

[56] References Cited

U.S. PATENT DOCUMENTS

| 3,221,794 | 12/1965 | Acres | 411/353 |
| 3,520,222 | 7/1970 | Placek | 411/353 X |
| 5,059,075 | 10/1991 | Kelly | 411/353 X |

FOREIGN PATENT DOCUMENTS 581645  12/1924  France ........................... 411/533

*Primary Examiner*—Neill R. Wilson
*Attorney, Agent, or Firm*—Sixbey, Friedman, Leedom & Ferguson; Stuart J. Friedman

[57] ABSTRACT

A fastener module includes a washer having an upper portion with a first passage defined therein and a lower portion with a second passage defined therein and communicating with the first passage. A head is mounted on the upper portion of the washer and has a shank extending downwardly from a lower portion thereof and mounted in the first passage. An annular groove is defined around a periphery of the shank and communicates with the second passage. A snapping ring is mounted in the annular groove and received in the second passage and is abutted against the upper portion of the washer.

4 Claims, 22 Drawing Sheets

5,618,145

FASTENER MODULE

FIELD OF THE INVENTION

The present invention relates to a fastener module, and more particularly to a nut module, bolt module or the like.

BACKGROUND OF THE INVENTION

A conventional fastener module is shown in FIG. 23, however, there still remain shortcomings therein.

There will be a complete illustration in the detailed description of the preferred embodiments, concerning the conventional fastener module.

The present invention has arisen to mitigate and/or obviate disadvantages of the conventional fastener module.

SUMMARY OF THE INVENTION

In accordance with one aspect of the present invention, there is provided a fastener module comprising a washer including an upper portion having a first passage defined therein and a lower portion having a second passage defined therein and communicating with the first passage, thereby forming a through passage. The second passage has a diameter greater than that of the first passage.

A head is mounted on the upper portion of the washer and has a shank extending downwardly from a lower portion thereof and mounted in the first passage. An annular groove is defined around a periphery of the shank and communicates with the second passage. A snapping ring is mounted in the annular groove and received in the second passage and is abutted against the upper portion of the washer.

Further features of the present invention will become apparent from a careful reading of the detailed description provided hereinbelow, with appropriate reference to the accompanying drawings.

DETAILED DESCRIPTION OF THE PREFERRED EMBODIMENTS

Figure 23:
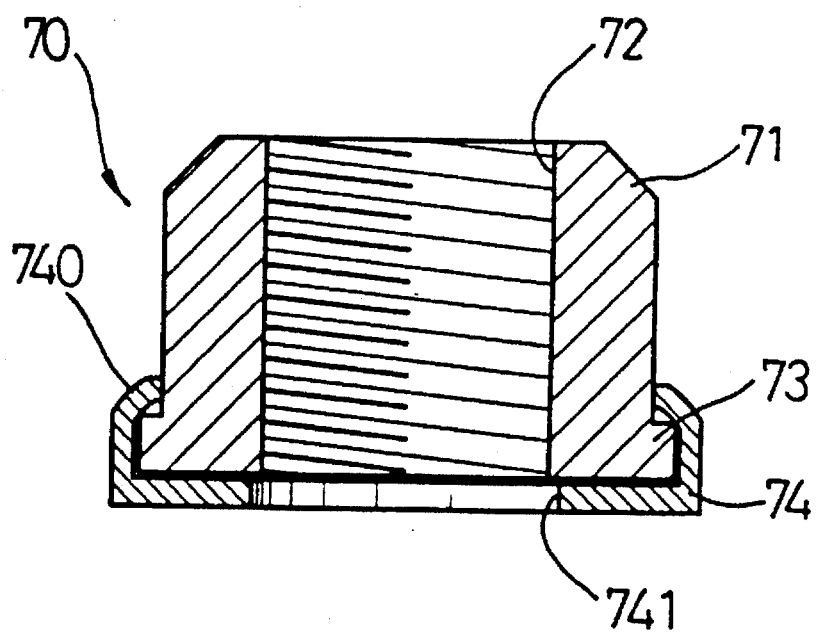
FIG. 23 is a front plan cross-sectional assembly view of a conventional nut module in accordance with the prior art.

For a better understanding of the present invention, reference is made to FIG. 23, illustrating a conventional fastener module. The fastener module can be adapted to be a nut module 70 which includes a hexagonal head 71 having a hole 72 threadedly and vertically defined therethrough and a flange 73 laterally protruding from a lower portion thereof. A washer 74 is mounted on an underside of the head 71 and has a hook 740 encompassing the flange 73 of the head 71. A passage 741 is vertically defined through the washer 74 and communicates with the hole 72. However, the hook 740 of the washer 74 is not easily made to precisely mate with the flange 73 of the head 71, thereby greatly increasing the price of manufacturing the washer 74.

Figure 1:
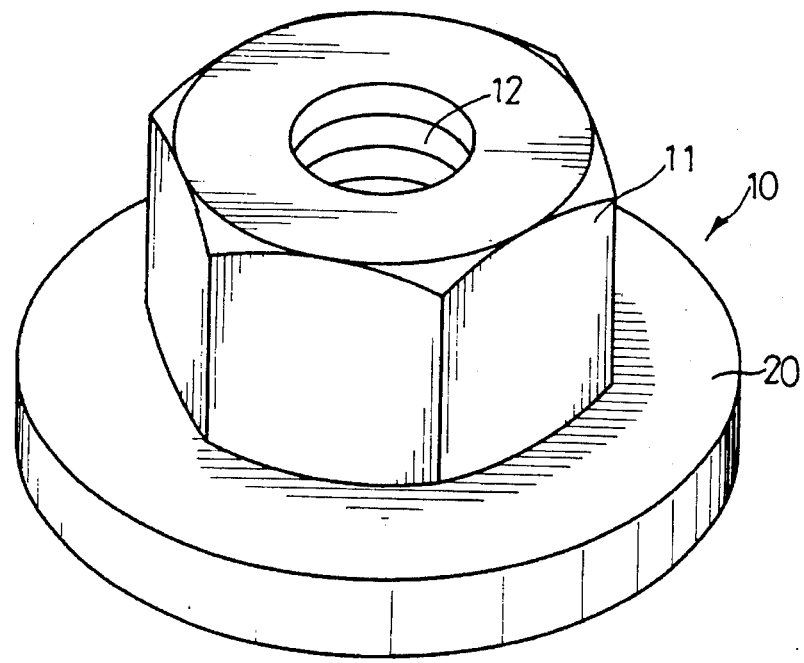
FIG. 1 is a perspective view of a nut module in accordance with the present invention.
Figure 2:
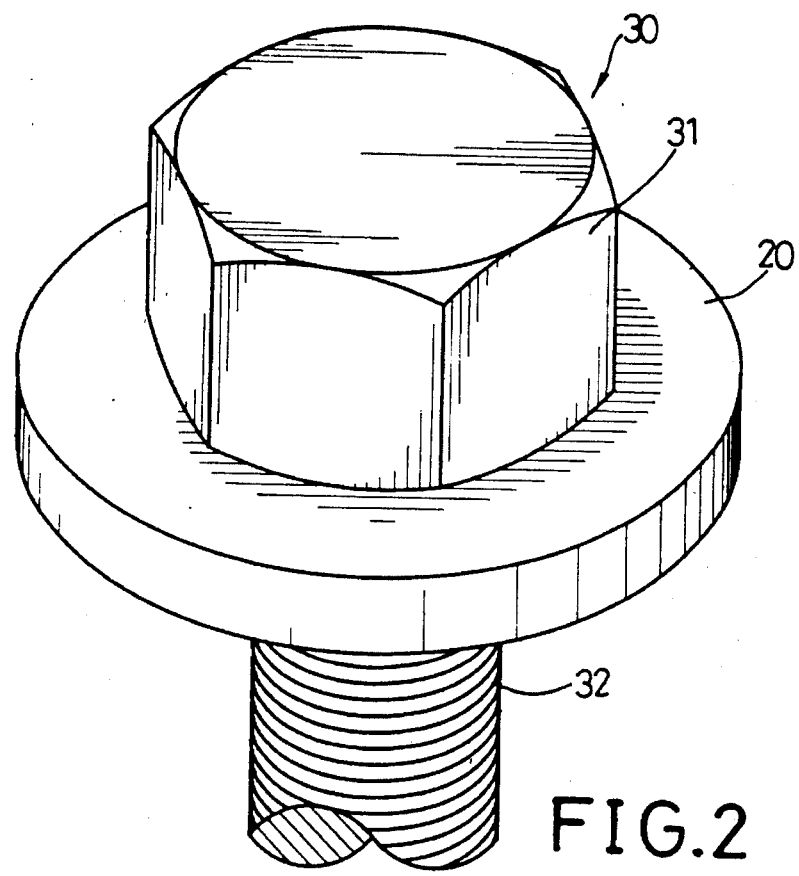
FIG. 2 is a perspective view of a bolt module in accordance with the present invention.

Referring to the drawings, and initially to FIGS. 1 and 2, a fastener module in accordance with the present invention is adapted to function as a nut module 10 as shown in FIG. 1 or a bolt module 30 as shown in FIG. 2.

Figure 3:
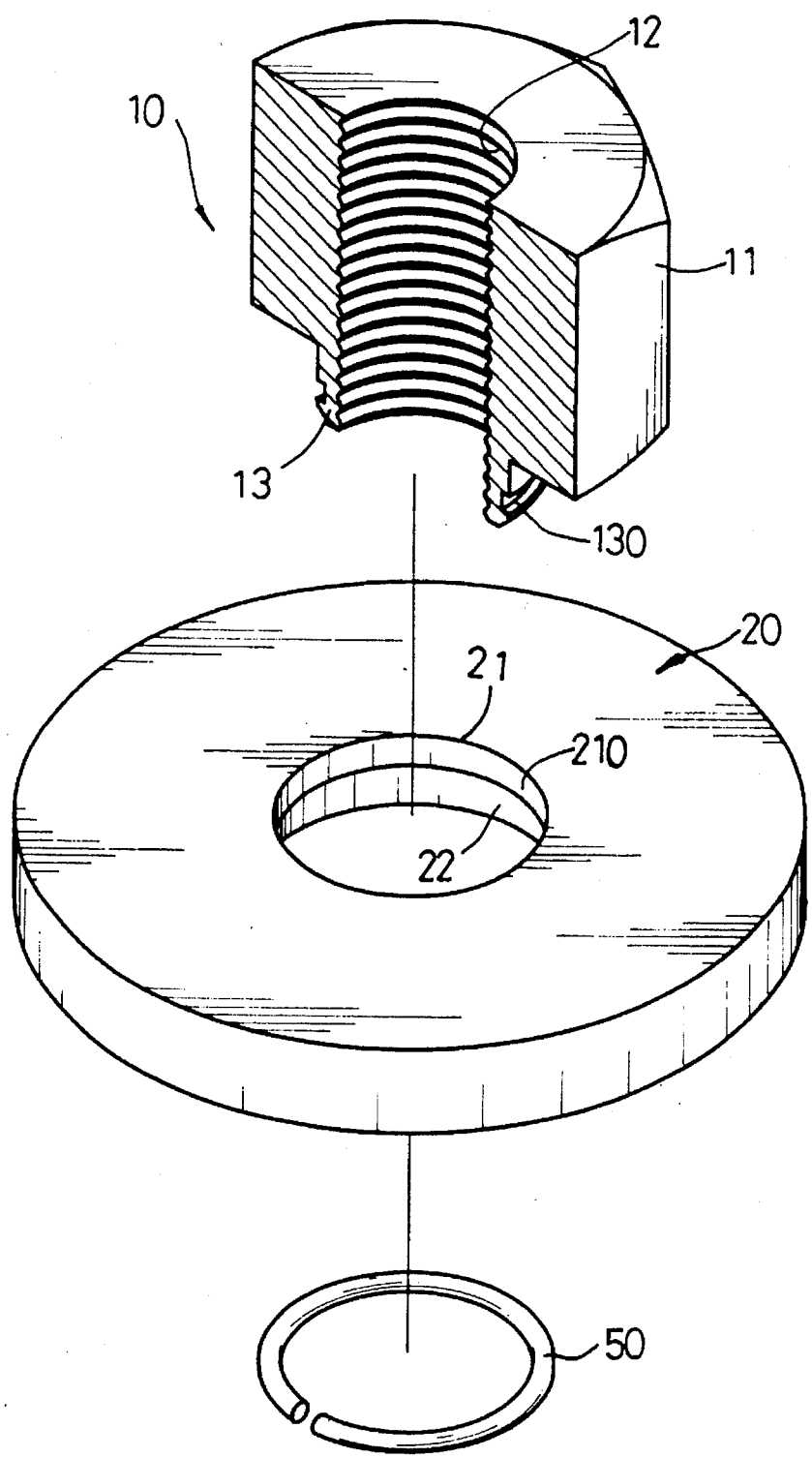
FIG. 3 is an exploded view of FIG. 1.
Figure 4:
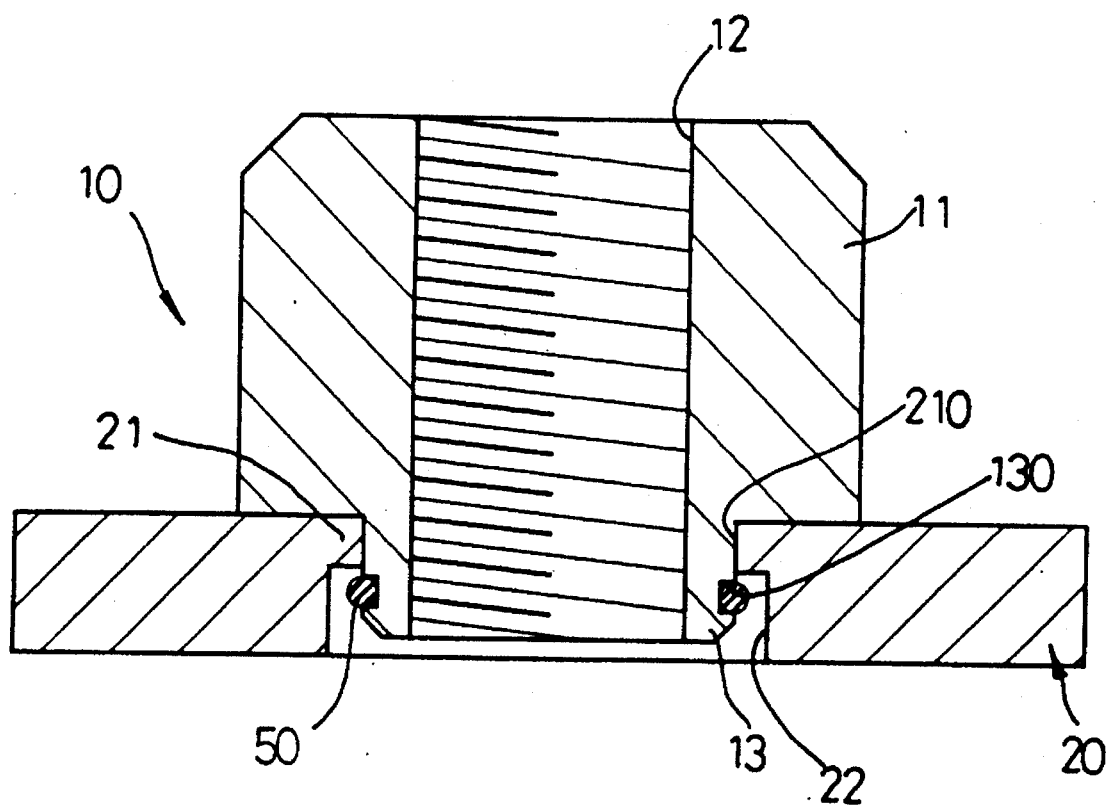
FIG. 4 is a front plan cross-sectional assembly view of FIG. 3.

Referring to FIGS. 1, 3 and 4, the nut module 10 comprises a washer 20 including an upper portion 21 having a first passage 210 defined therein and a lower portion having a second passage 22 defined therein and communicating with the first passage 210, thereby forming a through passage. Preferably, the second passage 22 has a diameter greater than that of the first passage 210.

A hexagonal head 11 is mounted on the upper portion 21 of the washer 20 and has a shank 13 extending downwardly from a lower portion thereof and mounted in the first passage 210. A hole 12 is threadedly defined through the head 11 vertically and an annular groove 130 is defined along an outer periphery of the shank 13 and communicates with the second passage 22. A snapping ring 50 is mounted in the annular groove 130 and received in the second passage 22 and is stopped by the upper portion 21 of the washer 20.

Figure 5:
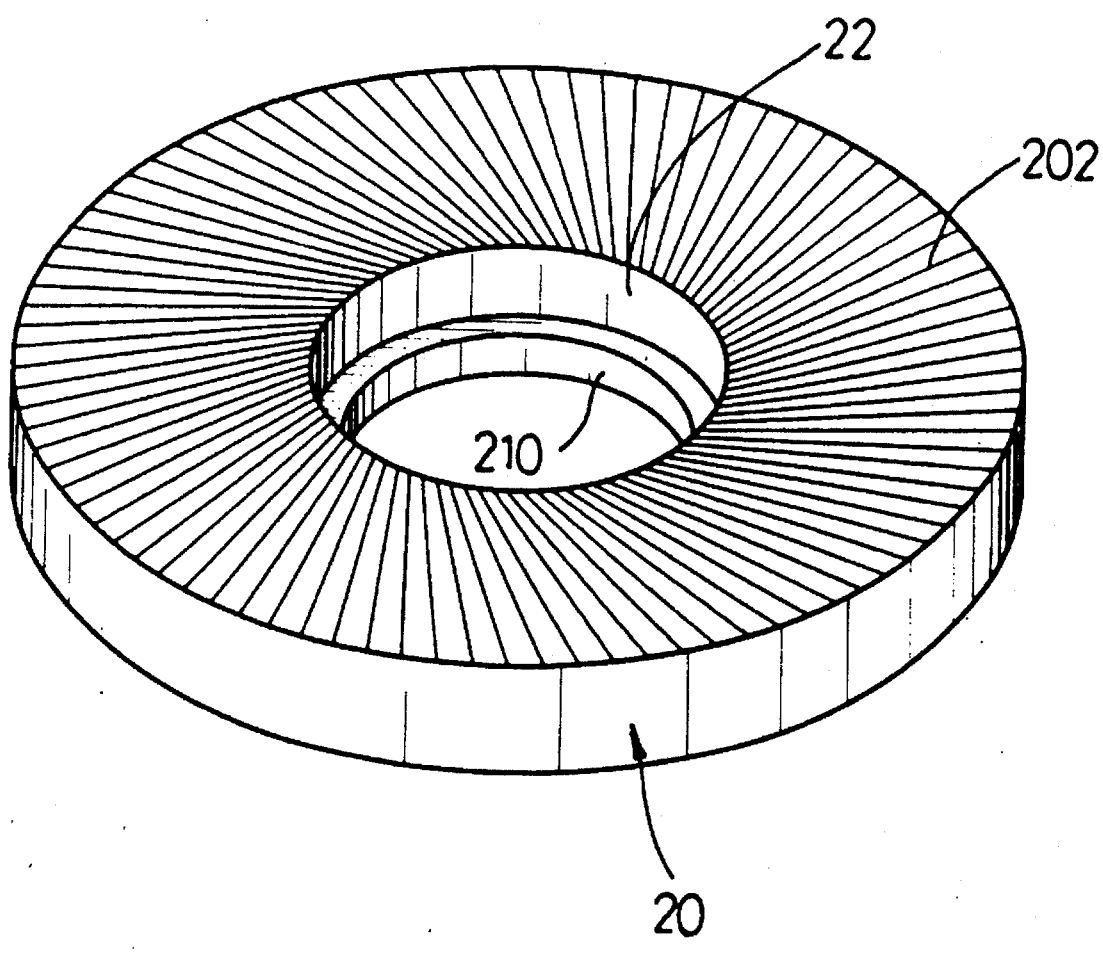
FIG. 5 is a bottom perspective view of a washer.

Referring to FIG. 5, the washer 20 has preferably a corrugated surface 202 formed on the underside thereof for increasing the friction thereof.

Figure 6:
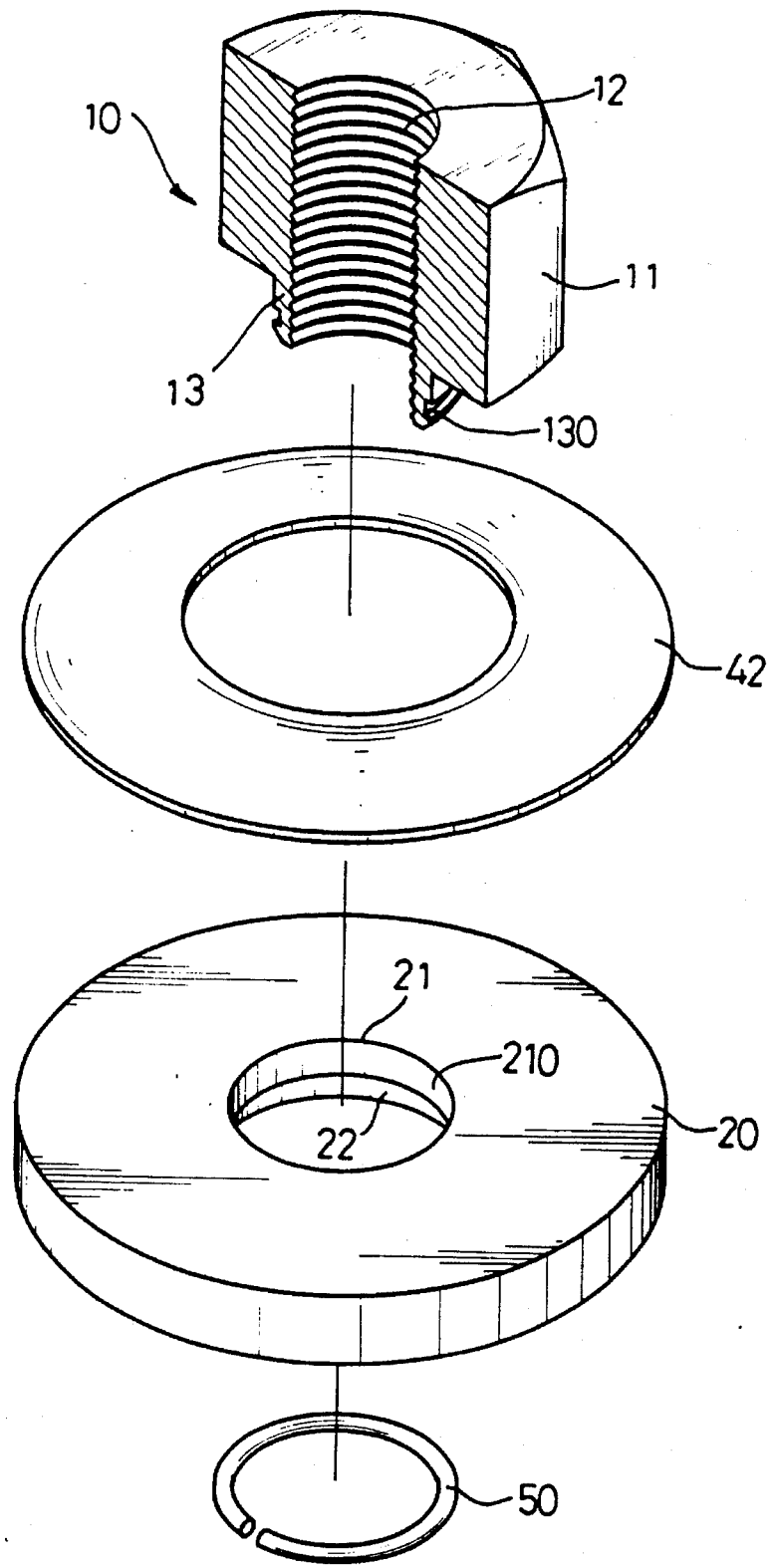
FIG. 6 is an exploded view of a nut module in accordance with another embodiment of the present invention.

Referring to FIG. 6, in accordance with another embodiment of the present invention, a plate gasket 42 is mounted around the shank 13 of the head 11 and is urged between the lower portion of the head 11 and the upper portion 21 of the washer 20.

Figure 7:
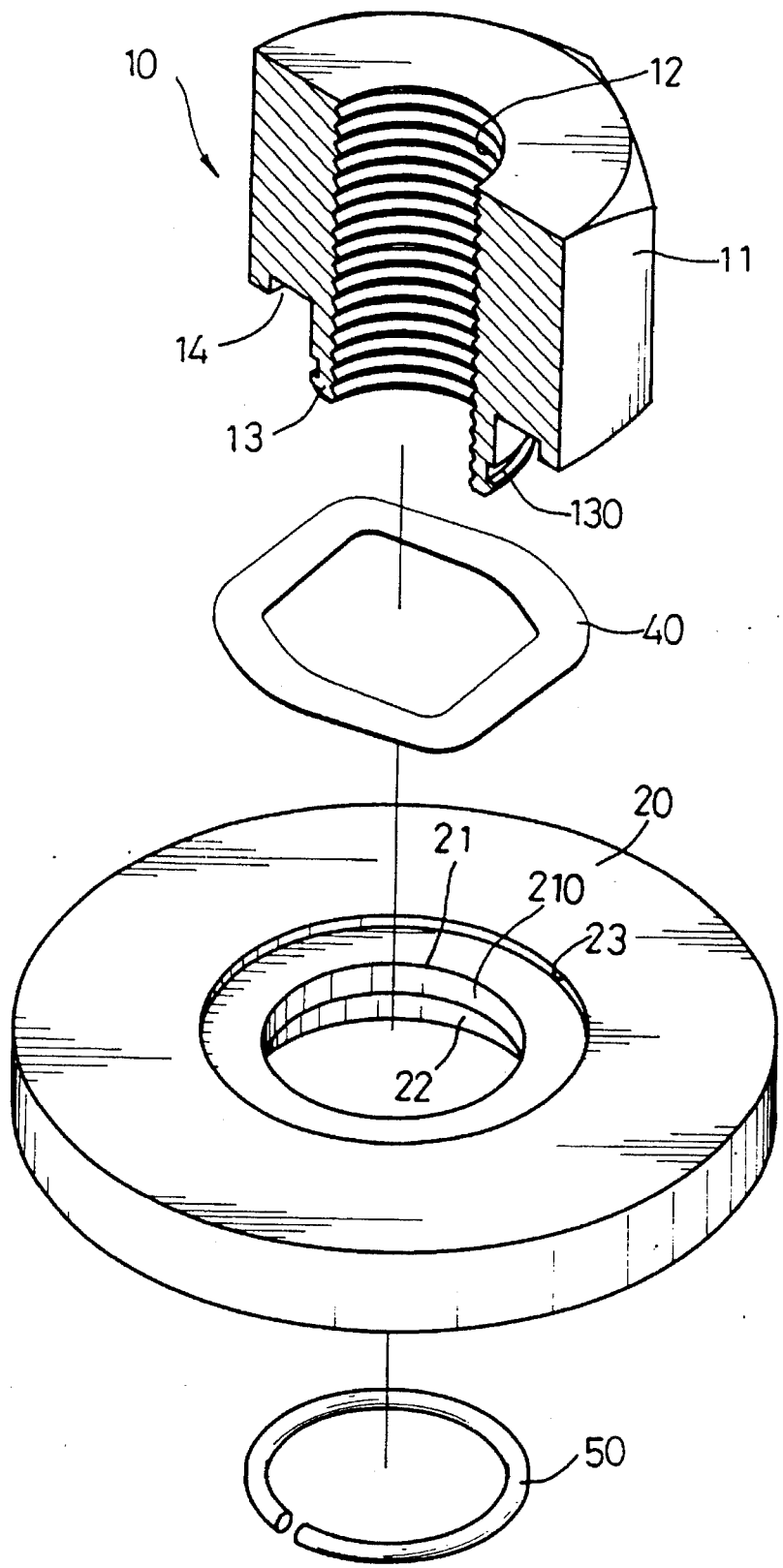
FIG. 7 is an exploded view of a nut module in accordance with a further embodiment of the present invention.
Figure 8:
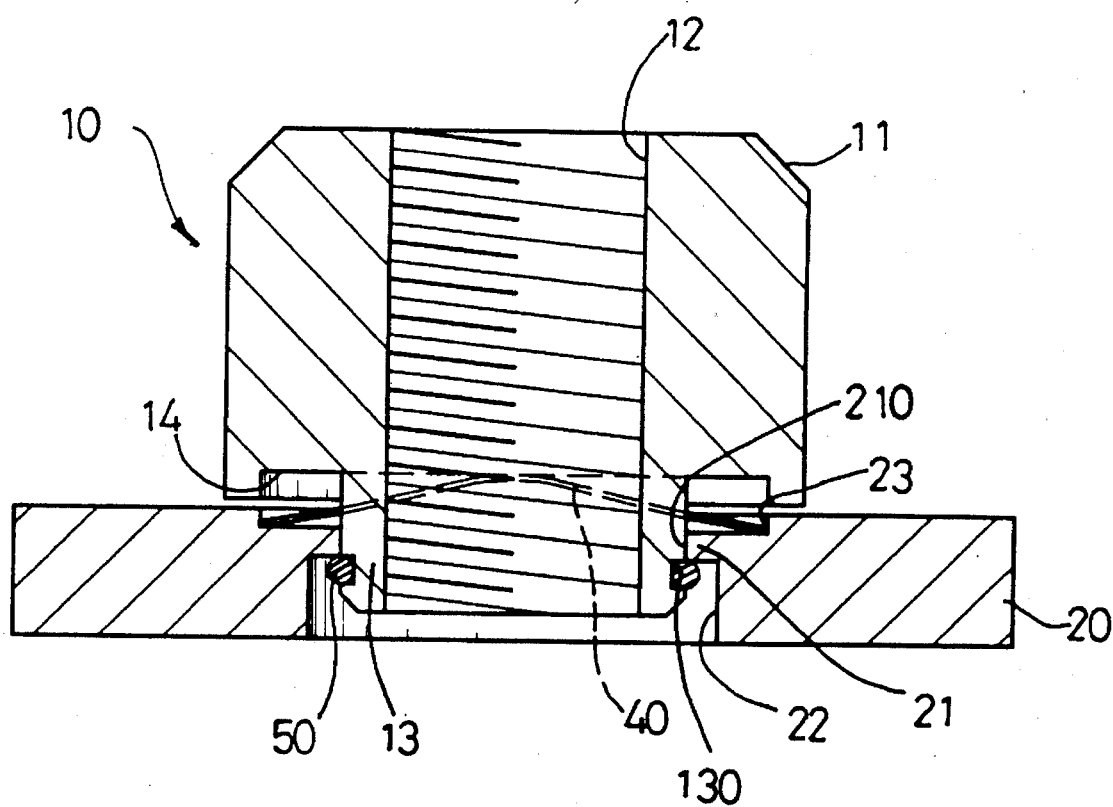
FIG. 8 is a front plan cross-sectional assembly view of FIG. 7.

Referring to FIGS. 7 and 8, in accordance with a further embodiment of the present invention, the head 11 has a recess 14 defined in the lower portion thereof. A depression 23 is defined in the upper portion 21 of the washer 20 and is located above and communicates with the first passage 210. Preferably, the depression 23 has a diameter greater than that of the first passage 210. An elastic member such as a waveform gasket 40 is mounted around the shank 13 and disposed between the recess 14 and the depression 23 and is urged between the lower portion of the head 11 and the upper portion 21 of the washer 20.

Figure 9:
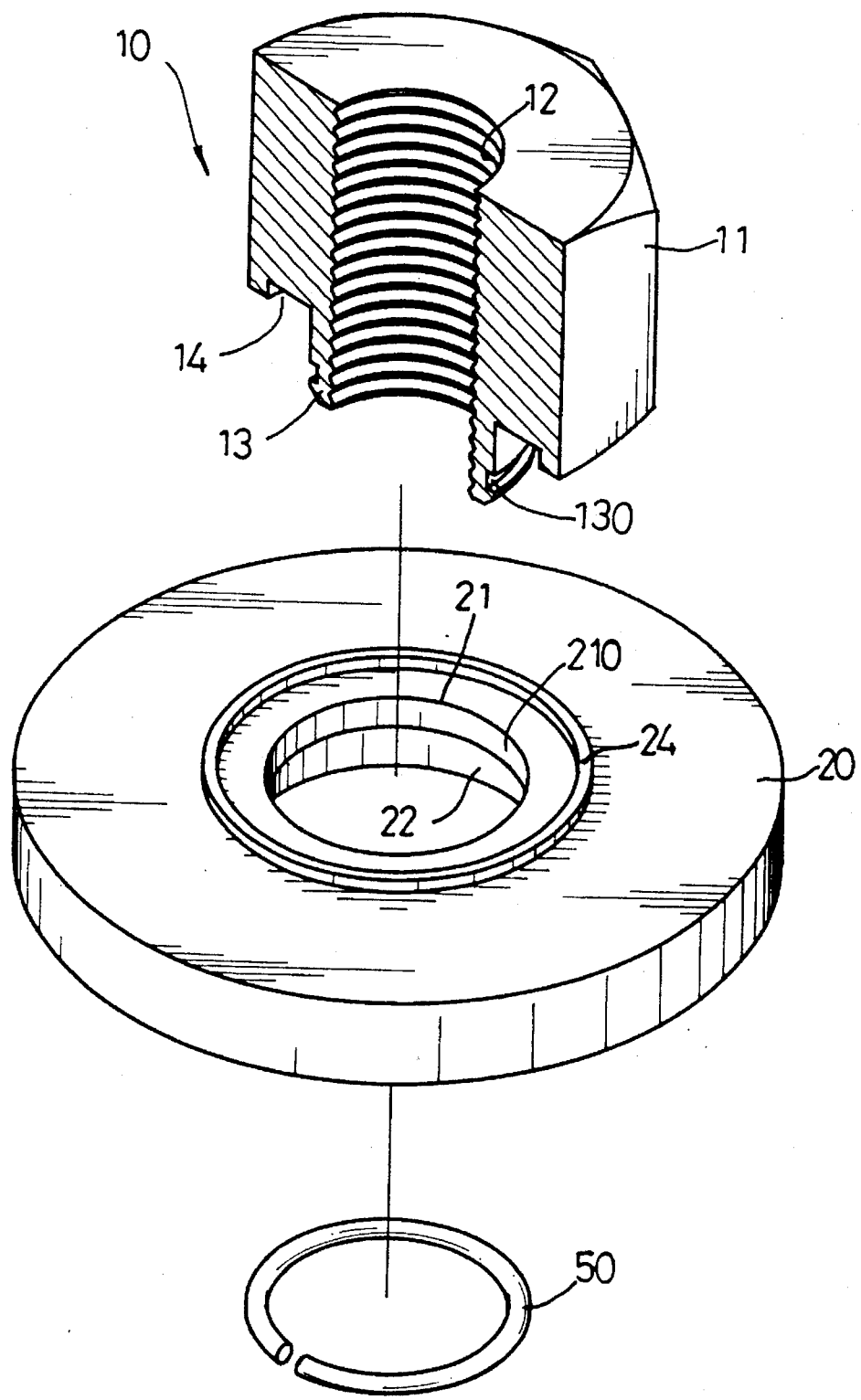
FIG. 9 is an exploded view of a nut module in accordance with a further embodiment of the present invention.
Figure 10:
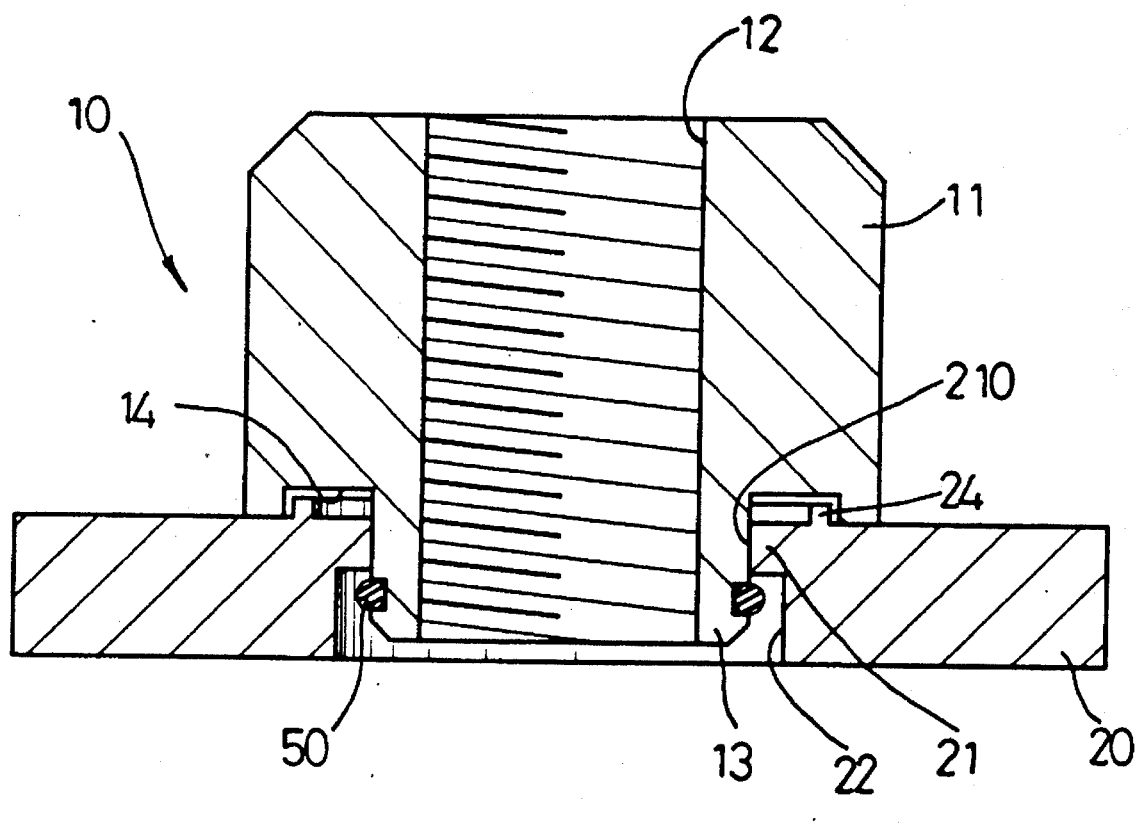
FIG. 10 is a front plan cross-sectional assembly view of FIG. 9.

Referring to FIGS. 9 and 10, in accordance with a further embodiment of the present invention, the head 11 has a recess 14 defined in the lower portion thereof. An annular flange 24 is formed on and extends upwardly from the upper portion 21 of the washer 20 and is disposed in the recess 14.

Figure 11:
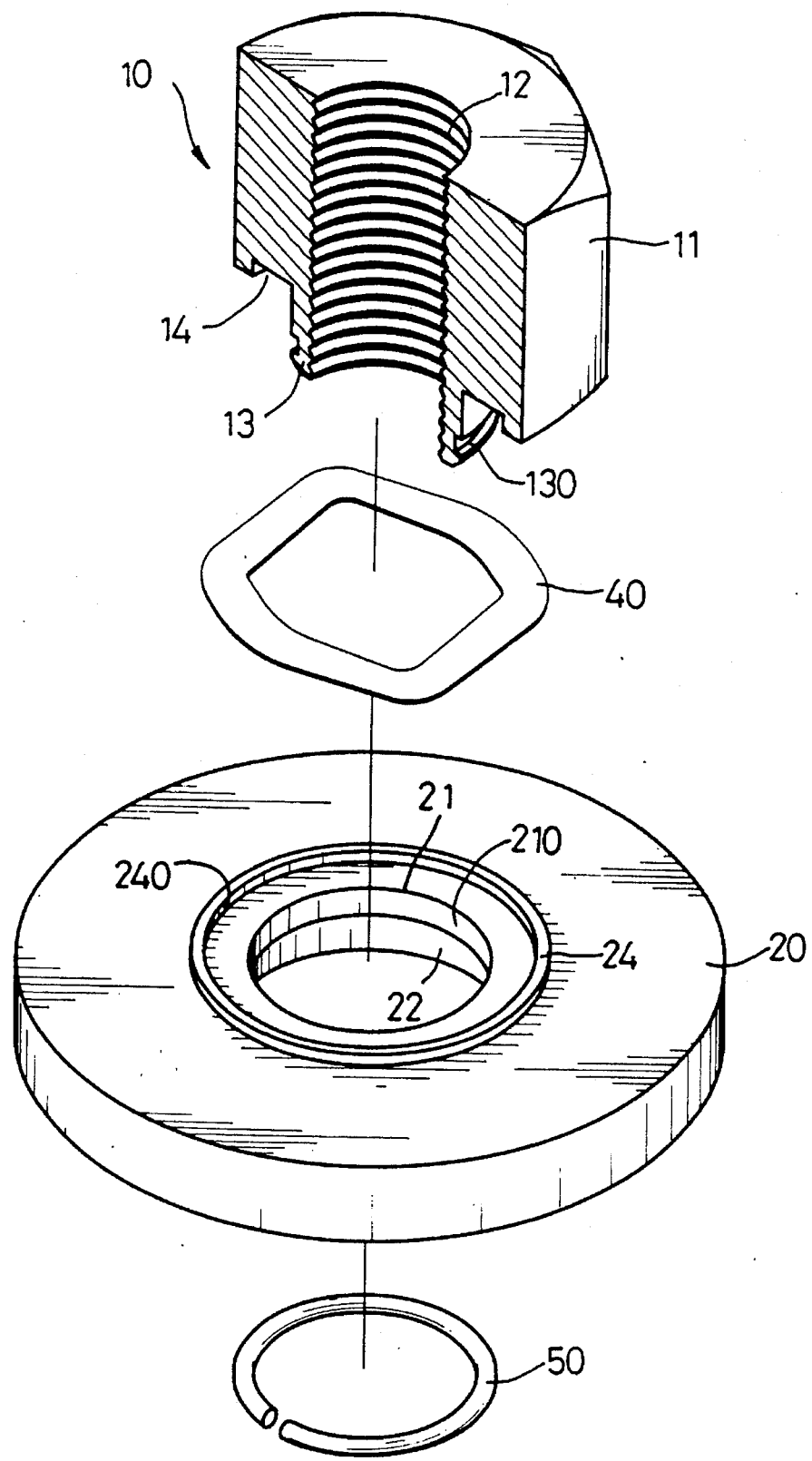
FIG. 11 is an exploded view of a nut module in accordance with a further embodiment of the present invention.
Figure 12:
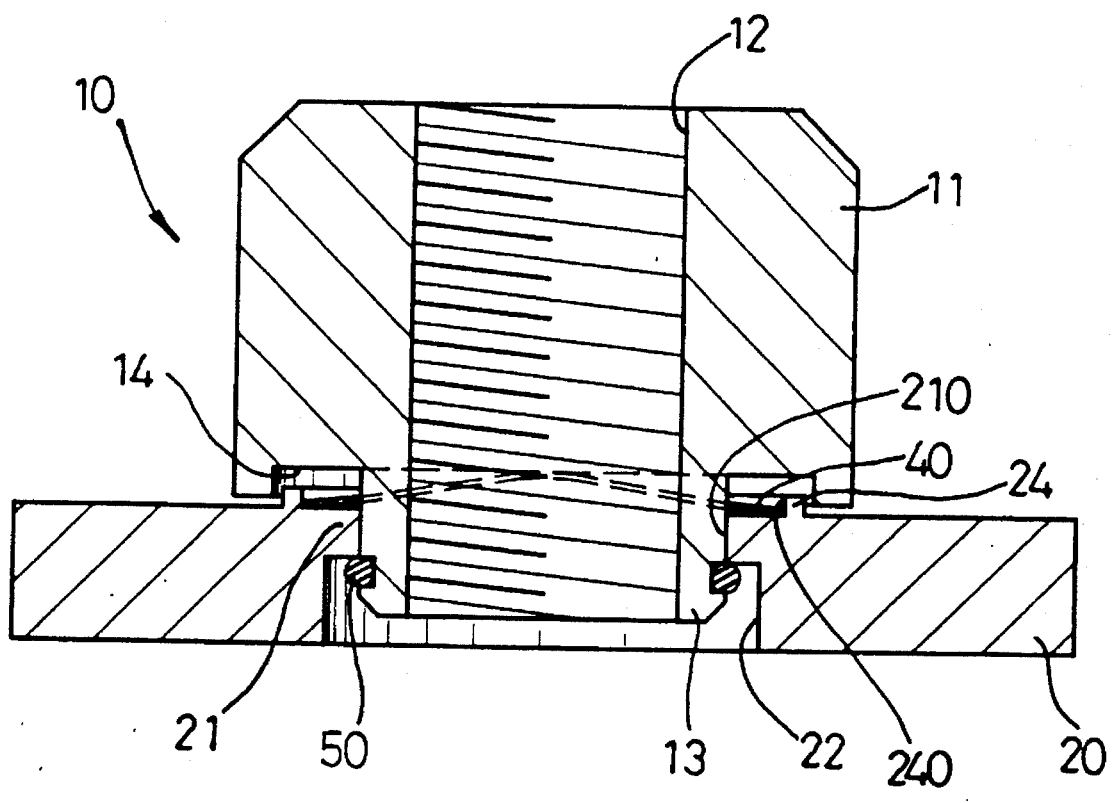
FIG. 12 is a front plan cross-sectional assembly view of FIG. 11.
Figure 13:
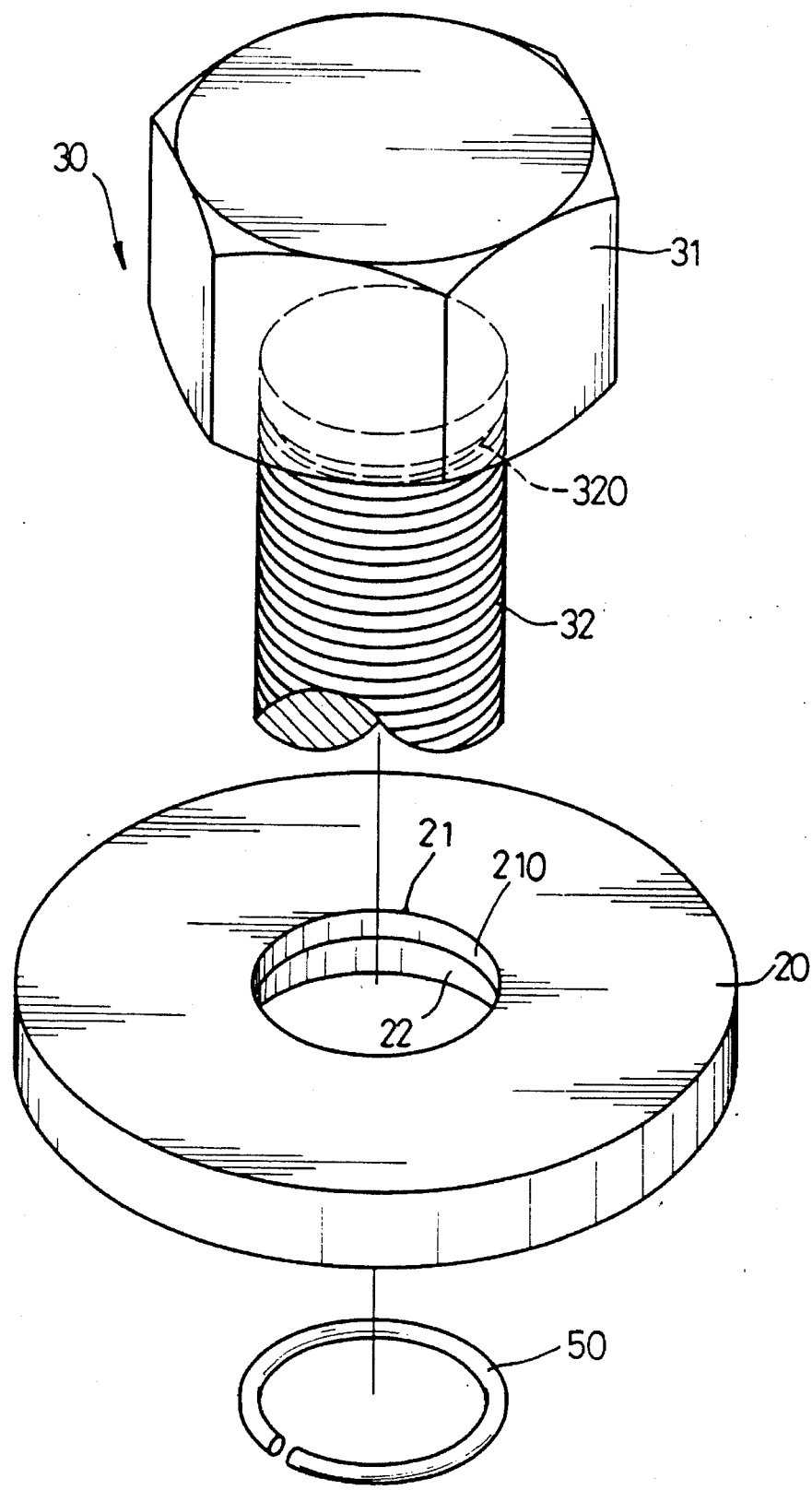
FIG. 13 is an exploded view of FIG. 2.
Figure 14:
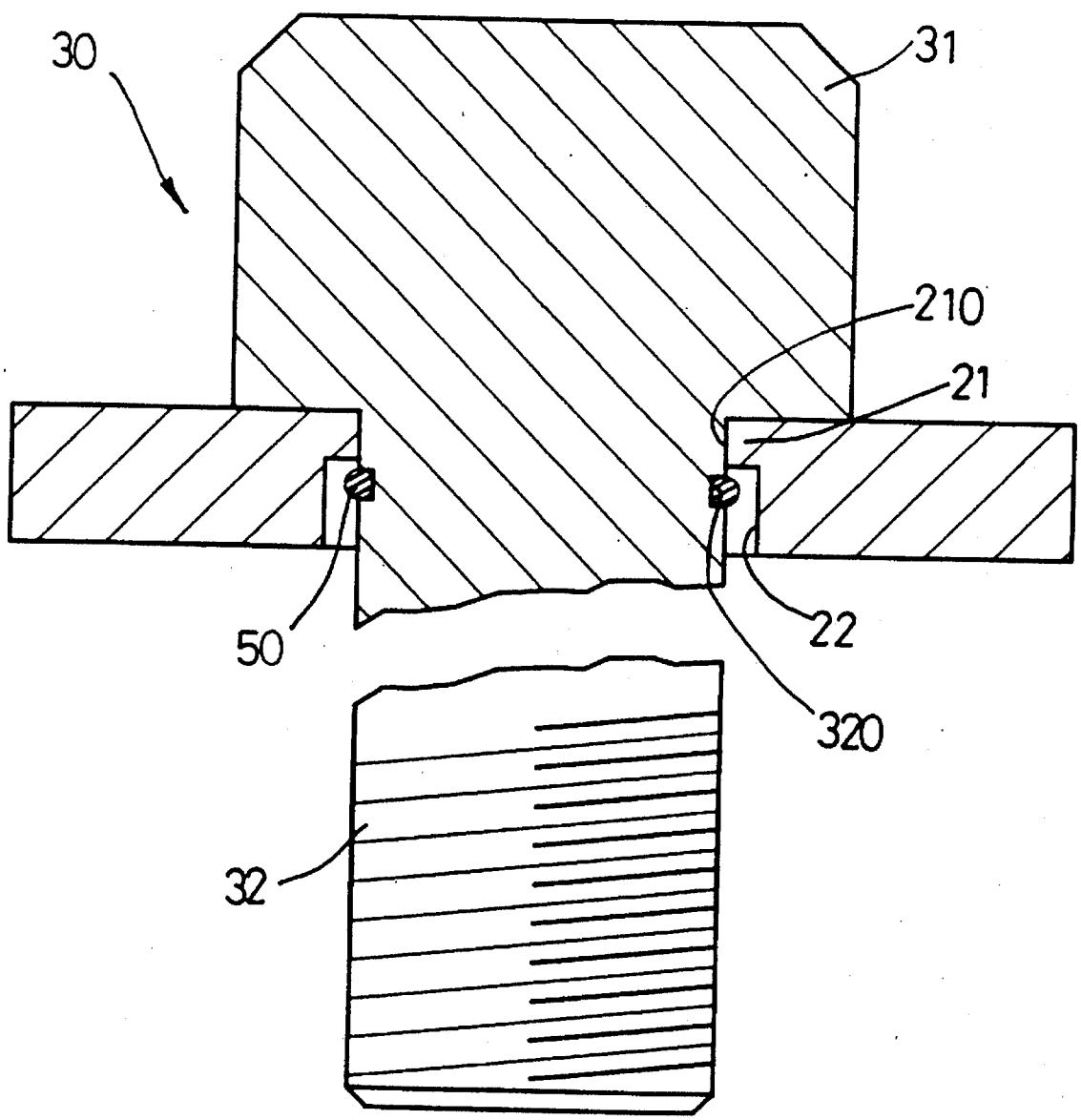
FIG. 14 is a front plan cross-sectional assembly view of FIG. 13.
Figure 15:
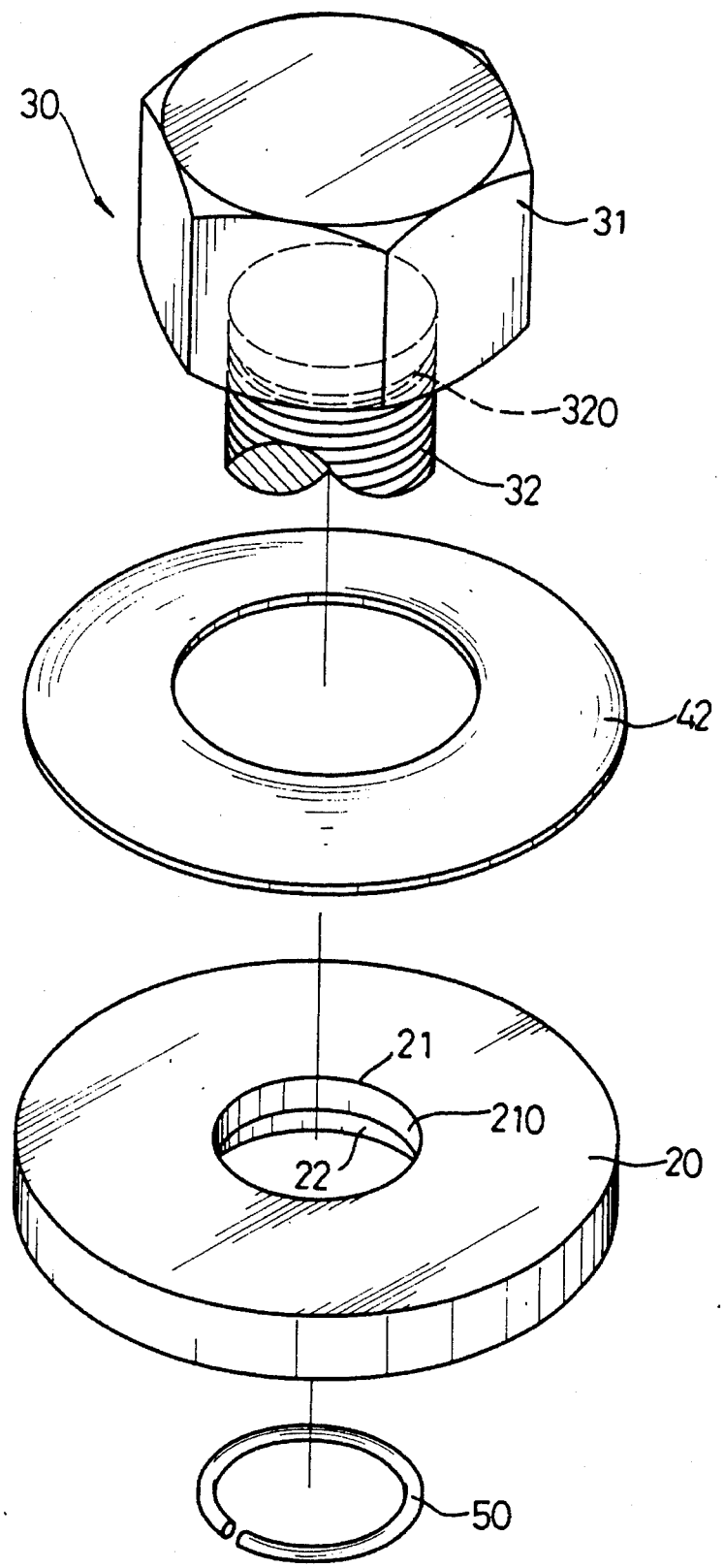
FIG. 15 is an exploded view of a bolt module in accordance with another embodiment of the present invention.
Figure 16:
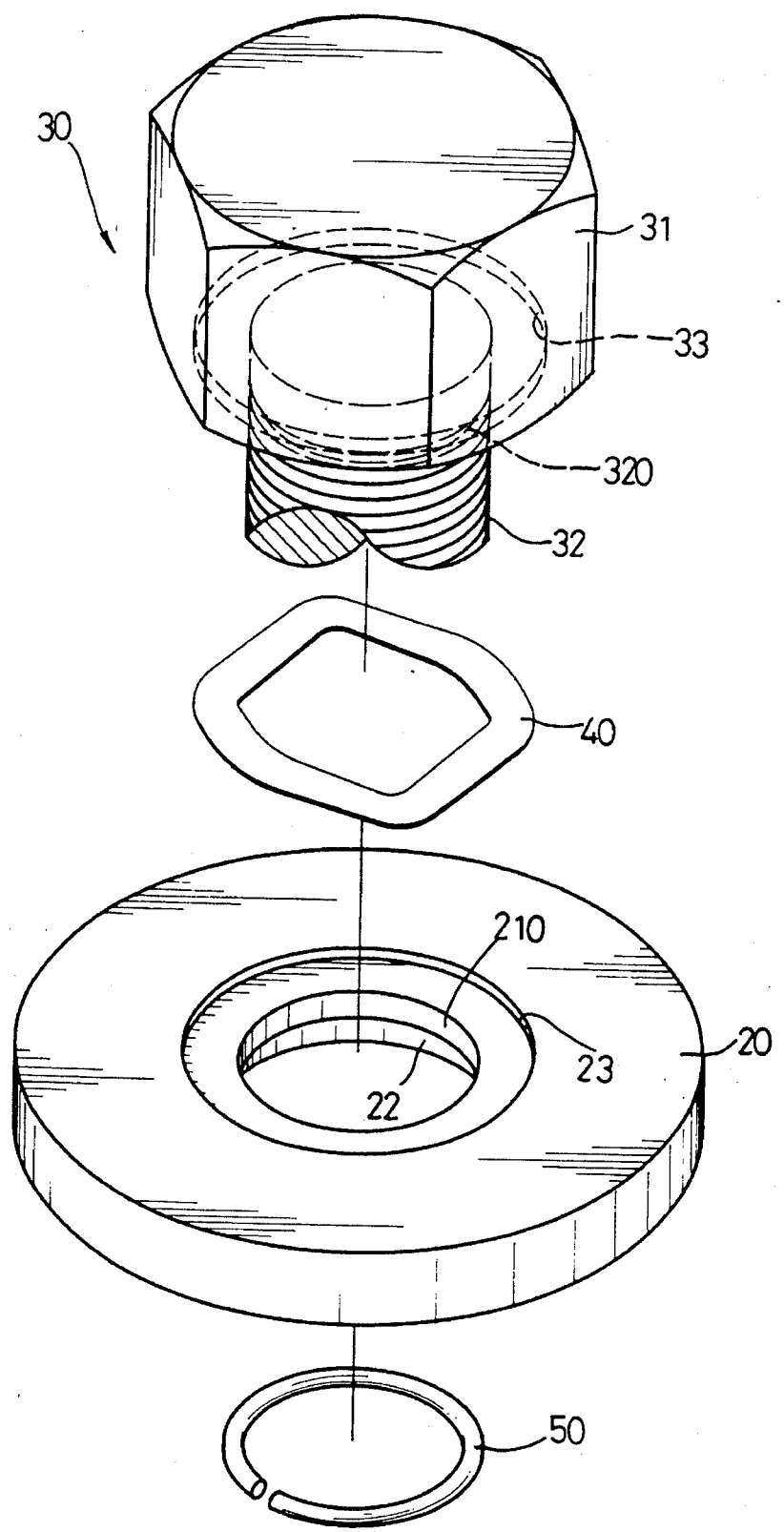
FIG. 16 is an exploded view of a bolt module in accordance with a further embodiment of the present invention.
Figure 17:
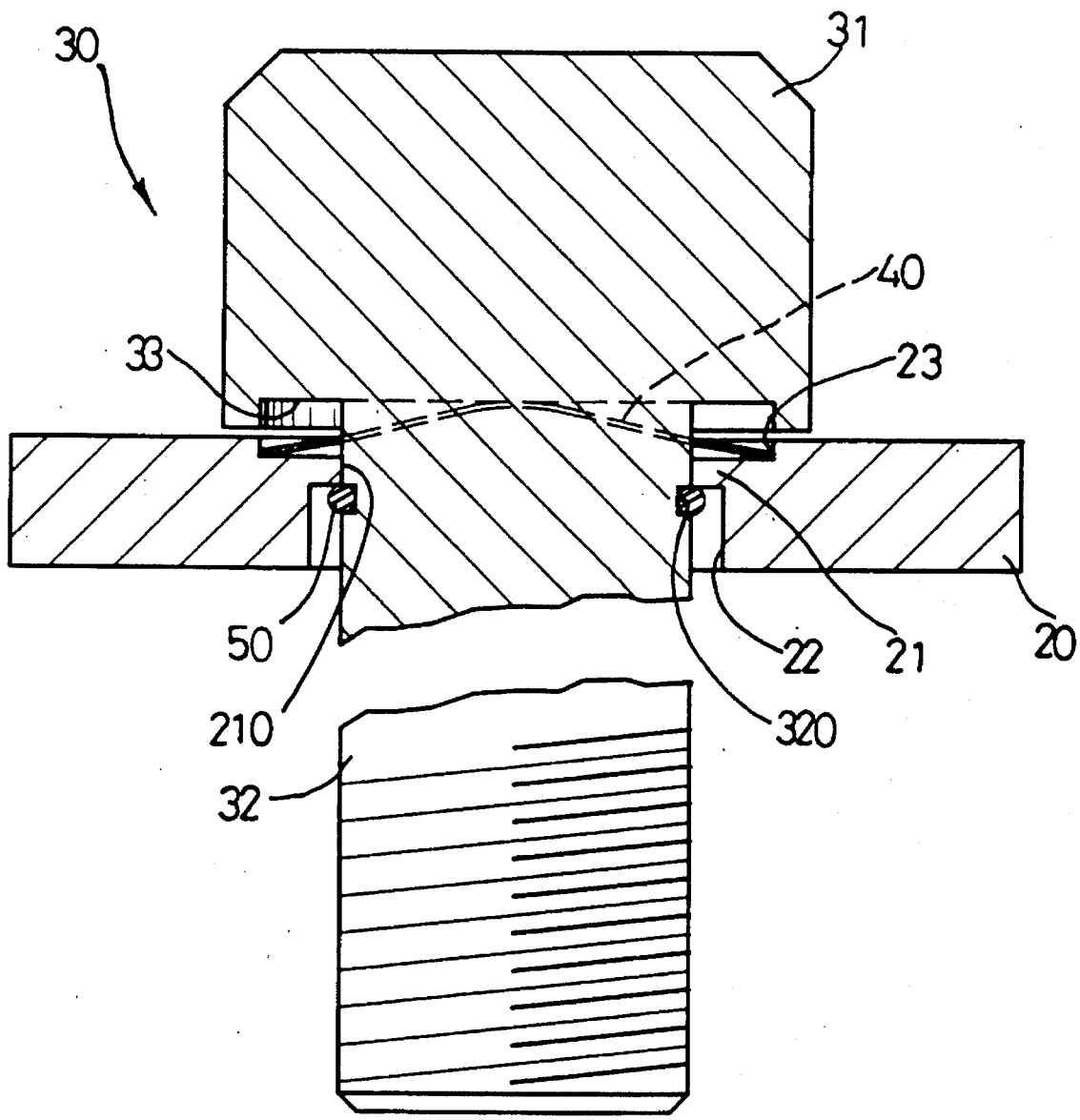
FIG. 17 is a front plan cross-sectional assembly view of FIG. 16.
Figure 18:
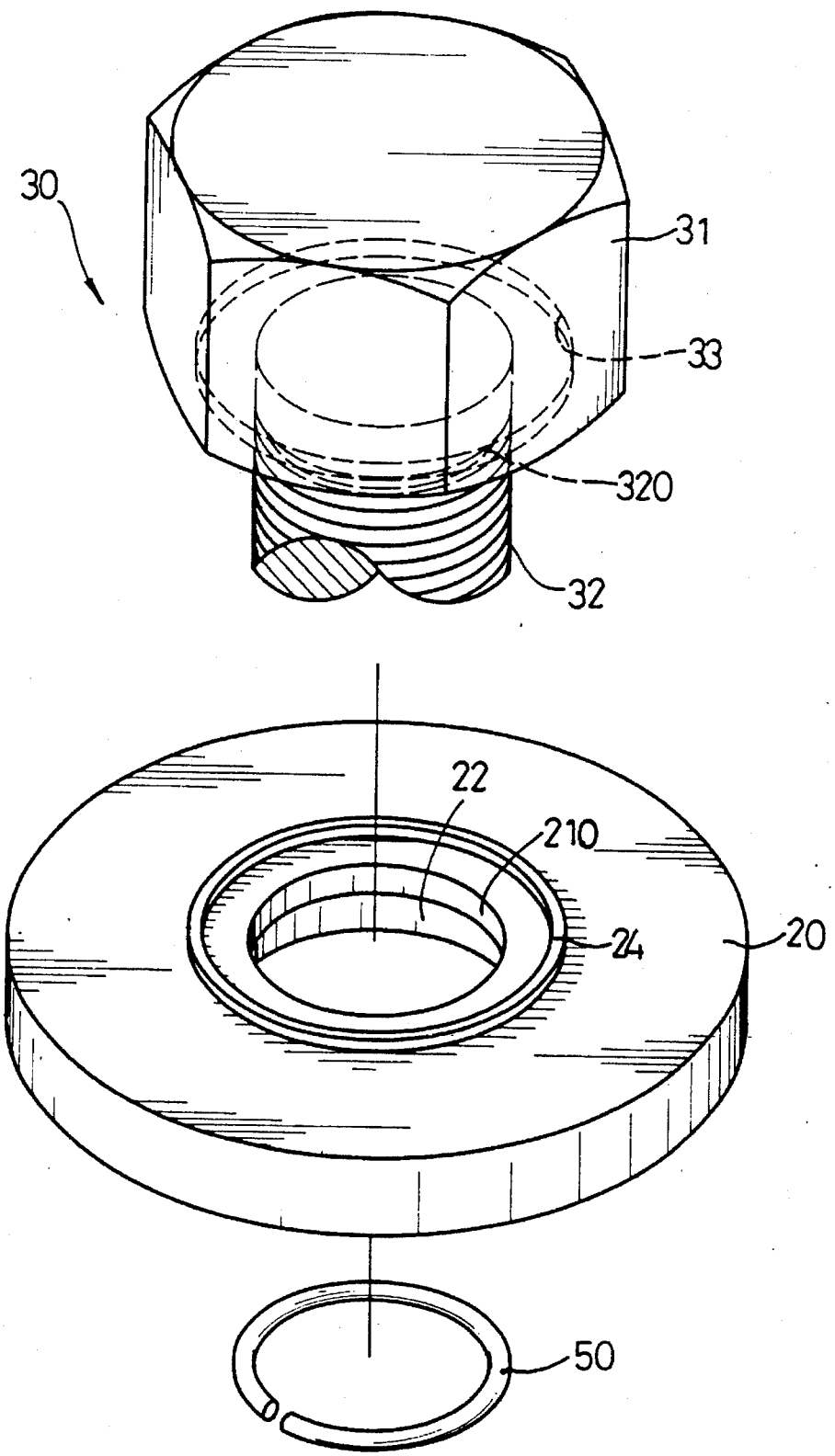
FIG. 18 is an exploded view of a bolt module in accordance with a further embodiment of the present invention.
Figure 19:
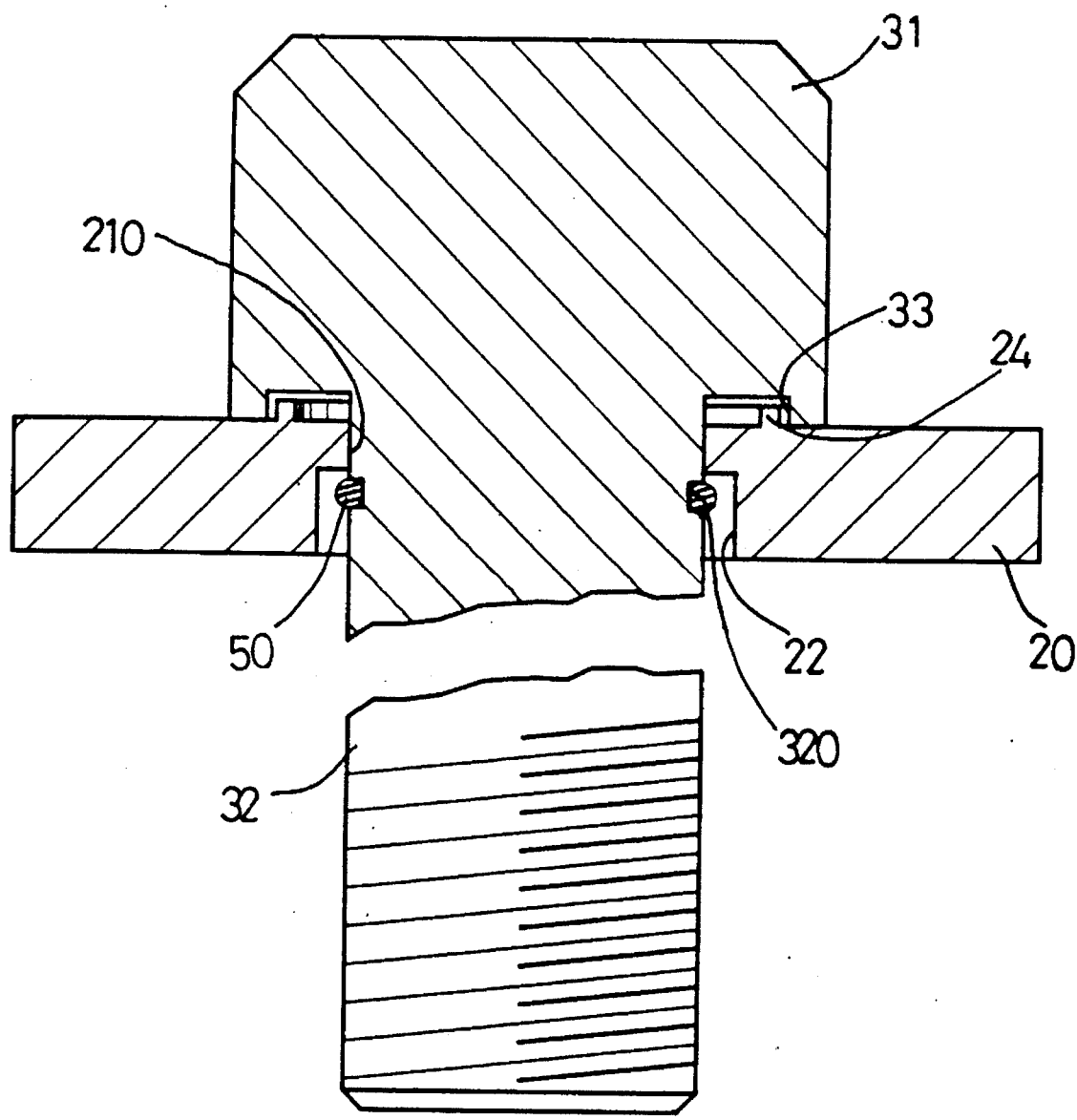
FIG. 19 is a front plan cross-sectional assembly view of FIG. 18.
Figure 20:
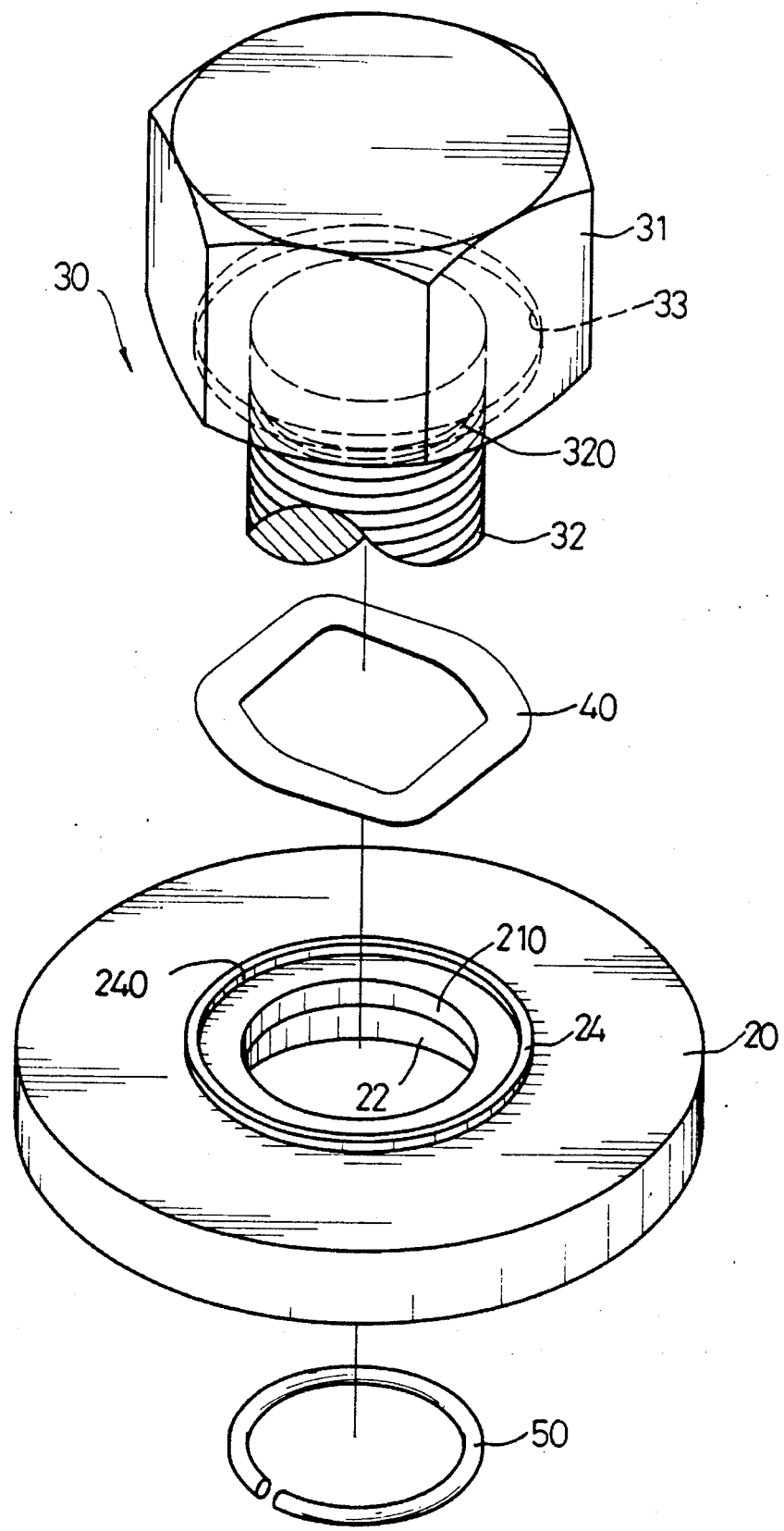
FIG. 20 is an exploded view of a bolt module in accordance with a further embodiment of the present invention.
Figure 21:
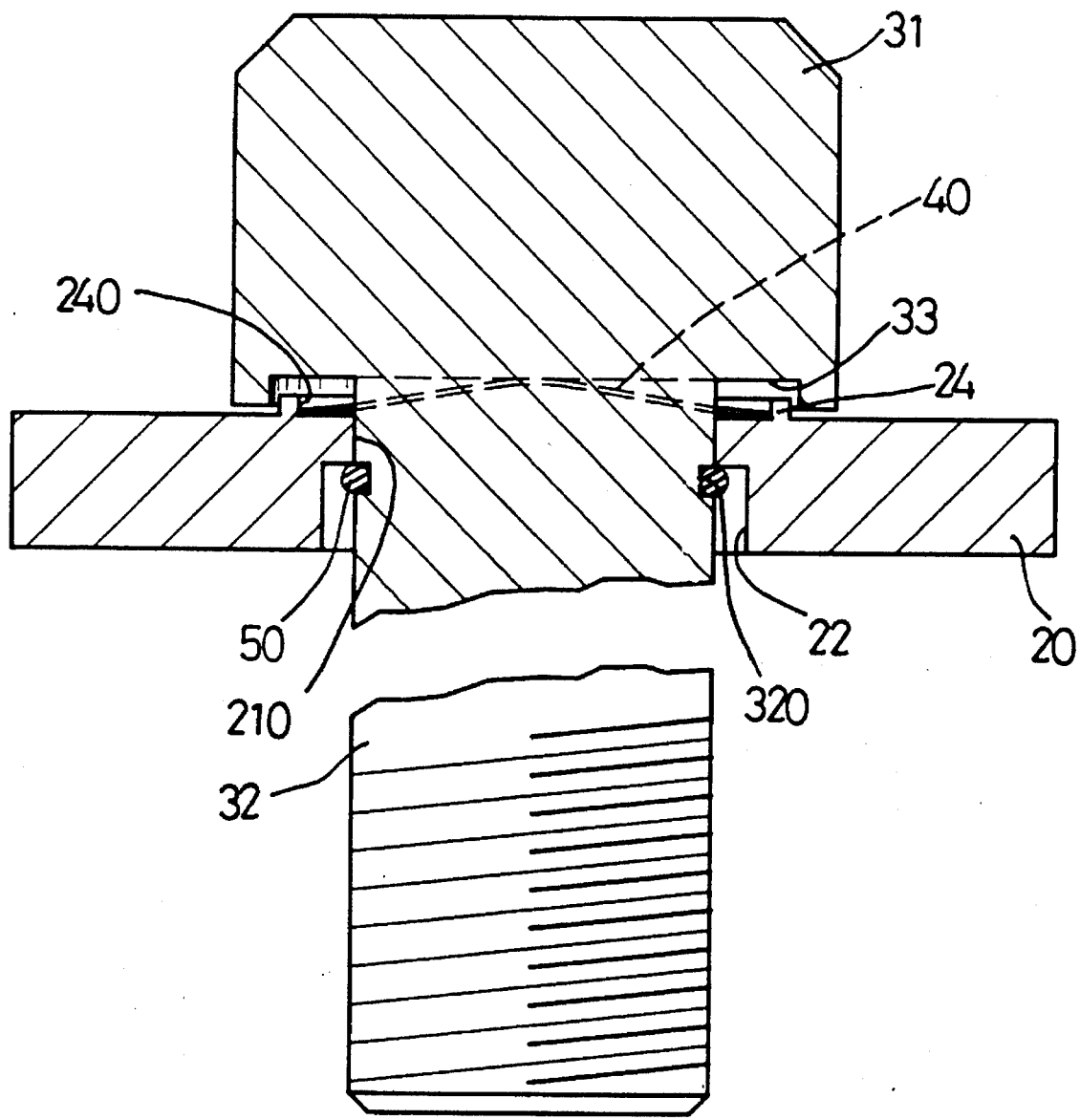
FIG. 21 is a front plan cross-sectional assembly view of FIG. 20.

Referring to FIGS. 11 and 12, in accordance with a further embodiment of the present invention, the head 11 also has the recess 14 defined in the lower portion thereof. An annular flange 24 is formed on and extends upwardly from the upper portion 21 of the washer 20 and is disposed in the recess 14. A depression 240 is defined in the annular flange 24 and is located above and communicates with the first passage 210. Preferably, the depression 240 has a diameter greater than that of the first passage 210. A waveform gasket 40 is mounted around the shank 13 and disposed between the recess 14 and the depression 240 and is urged between the lower portion of the head 11 and the upper portion 21 of the washer 20.

Referring to FIGS. 13–21, the fastener module is adapted to function as a bolt module 30 which has a hexagonal head 31, a shank 32 with an annular groove 320 defined therein, and a recess 33 defined in an underside thereof. The structure and feature of the bolt module 30 are similar to that of the nut module 10 and will not be further described in detail.

Figure 22:
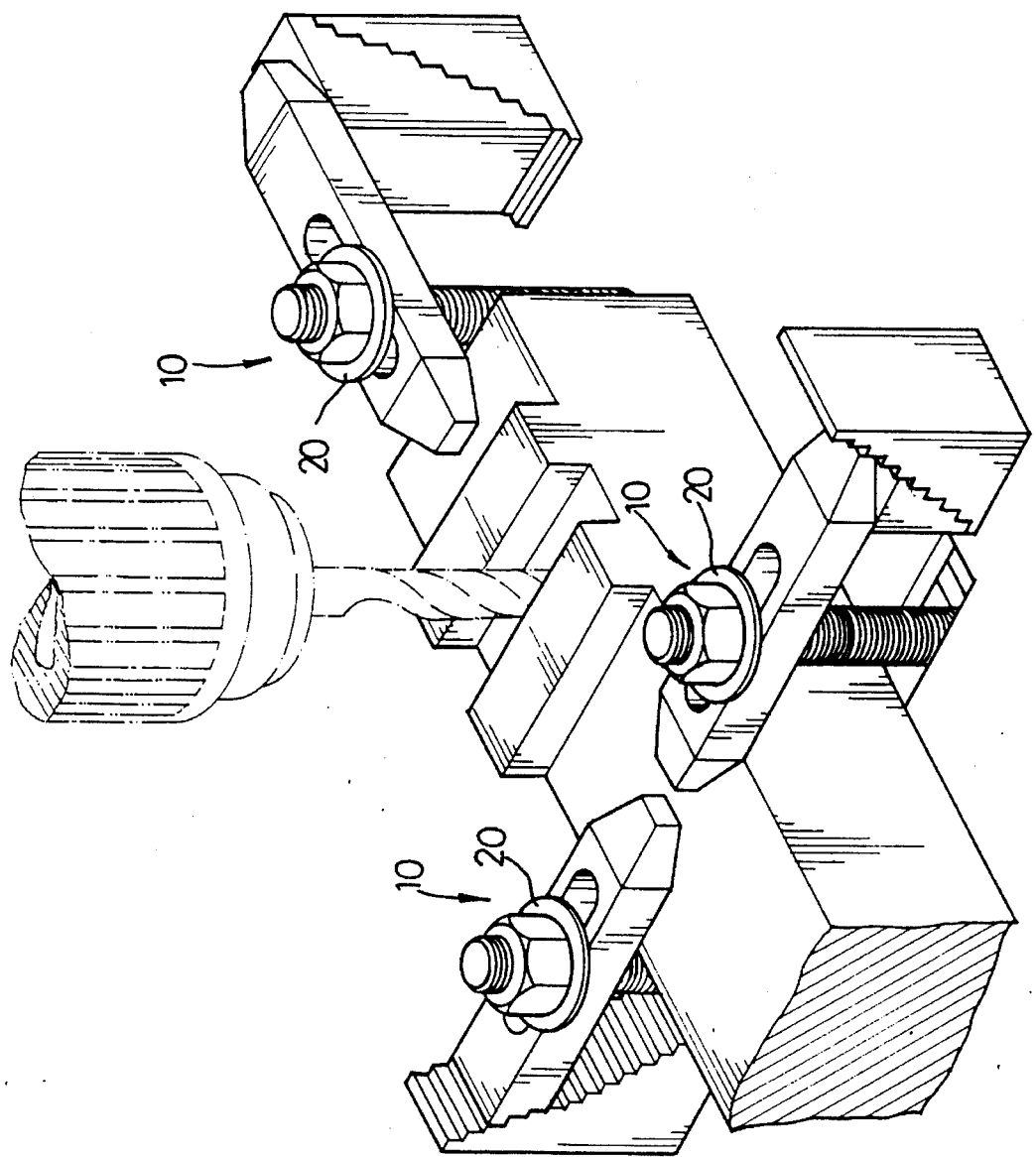
FIG. 22 is a schematic view showing a practice of the nut module.

Referring to FIG. 22, the nut module 10 is employed to fasten articles to a bed of a milling machine during a milling process.

Accordingly, by such an arrangement, the fastener module in accordance with the present invention is easily produced, thereby greatly decreasing cost in manufacturing. In addition, the waveform gasket 40 can be adapted to absorb shock or vibration created in a working process, thereby preventing the fastener module from becoming loosened. Further, the flange 24 can be provided to prevent dust or iron chips produced during the working process from entering into the space defined between the head and the washer 20.

It should be clear to those skilled in the art that further embodiments of the present invention may be made without departing from the scope and spirit of the present invention.

What is claimed is:

1. A fastener module comprising:

a washer including an upper portion having a first passage defined therein and a lower portion having a second passage defined therein and communicating with said first passage, thereby forming a through passage, said second passage having a diameter greater than that of said first passage;

a head mounted on the upper portion of said washer and having a shank extending downwardly from a lower portion thereof and mounted in said first passage, an annular grove defined along a periphery of said shank and communicating with said second passage;

a plate gasket mounted around said shank of said head and urged between the lower portion of said head and the upper portion of said washer; and a snapping ring mounted in said annular groove and received in said second passage and abutted against the upper portion of said washer.

2. A fastener module comprising:

a washer including an upper portion having a first passage defined therein and a lower portion having a second passage defined therein and communicating with said first passage, thereby forming a through passage, said second passage having a diameter greater than that of said first passage, and a depression defined in the upper portion of said washer and located above said first passage and having a diameter greater than that of said first passage;

a head mounted on the upper portion of said washer and having a shank extending downwardly from a lower portion thereof and mounted in said first passage, an annular groove defined along a periphery of said shank and communicating with said second passage, a recess defined in a lower portion of said head;

a waveform gasket mounted around said shank of said head and disposed between said recess and said depression and urged between the lower portion of said head and the upper portion of said washer; and a snapping ring mounted in said annular groove and received in said second passage and abutted against the upper portion of said washer.

3. A fastener module comprising:

a washer including an upper portion having a first passage defined therein and a lower portion having a second passage defined therein and communicating with said first passage, thereby forming a through passage, said second passage having a diameter greater than that of said first passage, and an annular flange formed on and extending upwardly from the upper portion of said washer;

a head mounted on the upper portion of said washer and having a shank extending downwardly from a lower portion thereof and mounted in said first passage, an annular groove defined along a periphery of said shank and communicating with said second passage, a recess defined in a lower portion of said head, said annular flange disposed in said recess; and a snapping ring mounted in said annular groove and received in said second passage and abutted against the upper portion of said washer.

4. The fastener module in accordance with claim 3, wherein a depression is defined in said annular flange, said depression having a diameter greater than that of said first passage, a waveform gasket mounted around said shank and disposed between said recess and said depression and urged between the lower portion of said head and the upper portion of said washer.

* * * * *